United States Patent [19]

Shishido et al.

[11] 4,022,438
[45] May 10, 1977

[54] STIRRING APPARATUS

[75] Inventors: Nobuyuki Shishido, Yokohama; Kazutami Muramatsu, Tokyo; Kikuo Moriya, Yokohama; Seiiti Yasuda, Yamato, all of Japan

[73] Assignee: Mitsubishi Kasei Kogyo Kabushiki Kaisha, Tokyo, Japan

[22] Filed: May 8, 1975

[21] Appl. No.: 575,796

[30] Foreign Application Priority Data

May 13, 1974 Japan .............................. 49-52976

[52] U.S. Cl. .............................................. 259/107
[51] Int. Cl.² ......................................... B01F 7/16
[58] Field of Search .............. 416/176, 177; 259/8, 259/23, 24, 43, 44, 66, 67, 107, 108

[56] References Cited

UNITED STATES PATENTS

| 282,224 | 7/1883 | Renfro | 259/107 |
|---|---|---|---|
| 283,323 | 8/1883 | Bruton | 259/107 |
| 757,144 | 4/1904 | Richardson | 259/108 |
| 976,684 | 11/1910 | Ohrynoweech | 416/175 |
| 1,598,185 | 8/1926 | Willard | 259/8 |
| 3,051,455 | 8/1962 | Magester | 259/8 |

Primary Examiner—Richard E. Aegerter
Assistant Examiner—John W. Shepperd
Attorney, Agent, or Firm—Oblon, Fisher, Spivak, McClelland & Maier

[57] ABSTRACT

In stirring apparatus of the type provided with helical ribbon impeller, the ratio of the width of each impeller blade to the diameter of impeller is made to be from 1.5/10 to 3/10 and the blades are provided with openings having an opening ratio expressed by a relation $$0.59/\sqrt[3]{D} < \text{opening ratio} < 2.28/\sqrt[3]{D}$$

where D represents the diameter of the impeller.

2 Claims, 5 Drawing Figures

STIRRING APPARATUS

BACKGROUND OF THE INVENTION

This invention relates to stirring apparatus, more particularly stirring apparatus provided with a helical ribbon impeller or agitator capable of stirring at high effieiencies highly viscous liquids as in the case of preparing polyesters by polymerization and condensation reactions.

Generally, it is necessary to use stirring apparatus provided with impellers having suitable configurations determined by the physical characteristics of the liquid to be stirred, especially the visosity thereof, so that it is usual to improve the efficiency of the stirring apparatus by using an impeller of adequate configuration.

Since the stirring and mixing of liquids having low viscocities are relatively easy there is no difficult problem except that when relatively large tanks are required. However, in the case of high visicosity liquids, uniform and rapid stirring and mixing are not always easy to obtain. Especially, if the constuction of the impeller were not adequate extremely non-uniform mixing would result which could not be eliminated by merely increasing the rotational speed of impeller or the mixing time. For this reason, where smaller impellers, turbine blades or propellers are used for admixing highly viscous liquids, dead spaces of substantial volume and number would be formed in the liquids.

Although anchor impellers are advantageous in that it is possible to accelerate the heat conduction from the inner surface of the tank to the bulk liquids and to prevent the build up of the solids deposited on the inner surface of the tank, the efficiency of the stirring and mixing is not always high. Furthermore, with the anchor impellers, although mixing of highly viscous liquids is possible, dead spaces are partially formed in the tank and the mixing is not so effective.

For the reasons described above, it has been recognized that helical ribbon impellers are suitable for mixing highly viscous liquids, but until today no helical ribbon impellers satisfactory for practical application has yet been available.

SUMMARY OF THE INVENTION

It is an object of this invention to provide novel stirring apparatus provided with helical ribbon impeller of improved design capable of effectively agitating highly viscous liquids with a small power consumption.

Another object of this invention is to provide improved helical ribbon impeller type stirring apparatus capable of increasing the gas-liquid interface area by frequently replenishing or renewing the surfaces of the interface doming into contact with the liquid being stirred.

According to this invention, these and other objects can be accomplished by providing stirring apparatus of the helical ribbon impeller type of the class comprising a tank, a rotary shaft vertically disposed in the tank, and a plurality of helical ribbon type stirring blades mounted on the rotary shaft, characterized in that the ratio of the width of each blade to the diameter of impeller is made to be from 1.5/10 to 3/10 and that the blades are provided with an opening having an opening ratio expressed by a relation $$0.59/ \sqrt[3]{D} < \text{opening ratio} < 2.28/ \sqrt[3]{D}$$

where D represents the diameter of the impeller. The opening may take any desired configuration such as an elongated slot extending in the direction of the length of the blade, polygons, and a series of circles of different diameter. With the construction defined above, the stirring blades are required to be supported by horizontal supports alone and no vertical supports is necessary which prevent the flow of the liquid in the vertical direction.

Where URe represents impeller Reynolds Number and Np represents Power Number.

Figure 4:
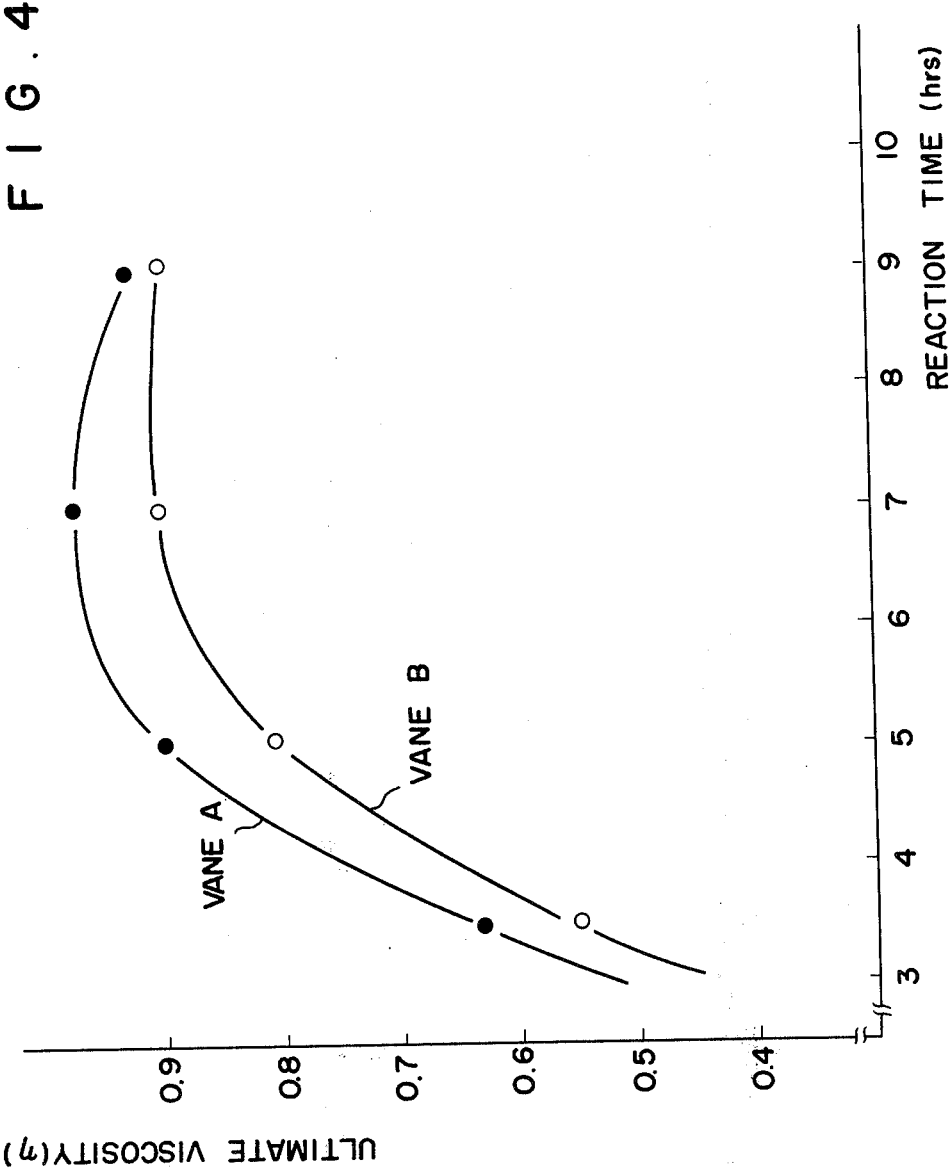
Figure 5:
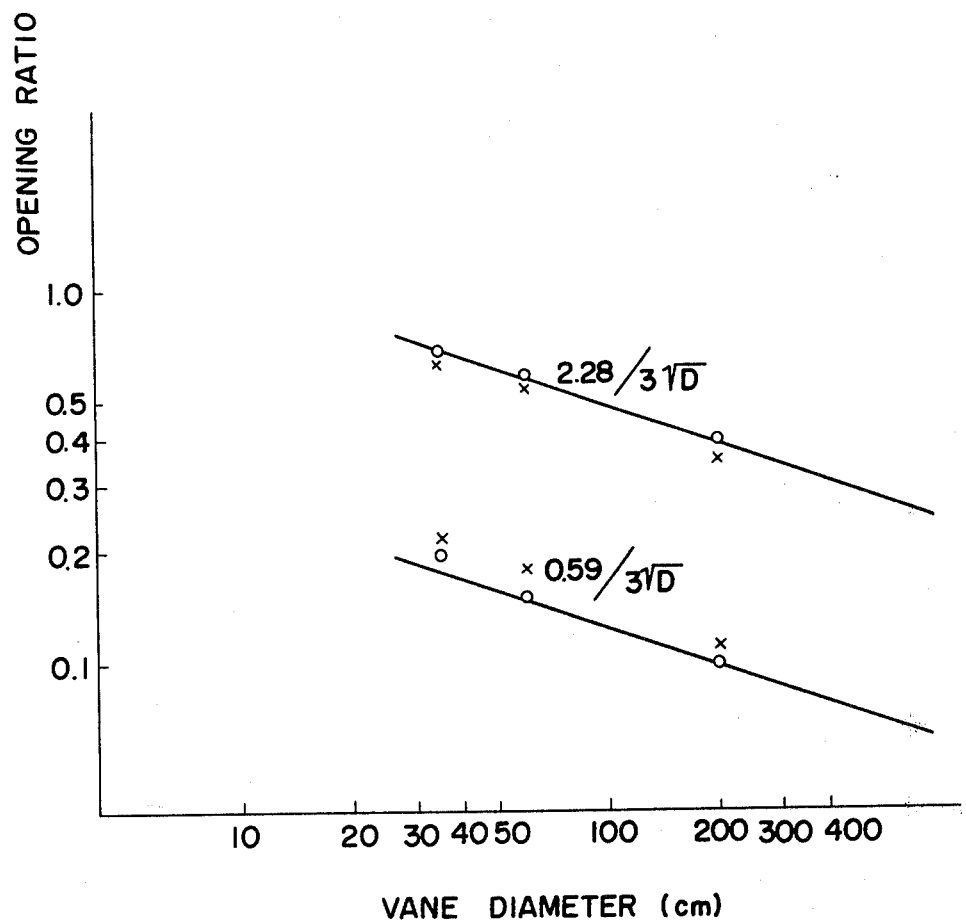

FIG. 4 is a graph showing the relationship between the degree of polymerization expressed in intrinsic viscosity and the reaction time; and FIG. 5 is a graph showing the relationship between the opening ratio and the impeller diameter.

DESCRIPTION OF THE PREFERRED EMBODIMENT

The stirring apparatus shown in the accompanying drawings is suitable for effecting polymerization and condensation reactions when preparing polyesters, and comprises a cylindrical tank 1 including a cylindrical portion 2 having a cone shaped bottom wall 3 and a heating jacket 4 encircling the cylindrical portion 2, and a plurality of helical ribbon type blades 13 which are rotated by a driving shaft 5 and partially immersed in the liquid contained in the tank. Each helical ribbon type blade has a constant width throughout its length and is provided with a slot 14 preferably having a constant width and supported by a horizontal supporting rod 15 secured to the shaft 5. At the lower end of the shaft 5 is provided auxiliary blades 16. The outer end of each helical ribbon type blade 13 is positioned very close to the inner wall of the cylindrical portion 2 with a clearance of less than 5/100 of the tank inner diameter.

The tank 1 is provided with an inlet opening 6 for the raw material liquid, and an exhaust opening 7 for low boiling point components, the opening 7 being connected to exhaust and evacuating pipes, not shown. An inlet opening 8 and a discharge opening 9 for heating medium is provided for the jacket 4. A discharge pipe 10 for polymerized and condensed reaction liquid is connected to the bottom of the tank 1 through a valve 11. There is also provided a tube 12 for inserting a thermometer, not shown.

The feature of this invention lies in the provision of the openings 14 for the helical ribbon type blades. More particularly, in accordance with this invention, the ratio of the width of the blade to the diameter of the impeller (hereinafter termed a "blade width ratio") is selected to be in a range of from 1.5/10 to 3/10 and the opening ratio (the ratio of the area of opening to the total area of one helical ribbon type blade containing said opening) is selected to satisfy a relation $$\frac{0.59}{\sqrt[3]{D}} < \text{opening ratio} < \frac{2.28}{\sqrt[3]{D}}$$

where D represents the diameter of the impeller.

Where the blade width ratio is larger than 3/10, or even when the blade width ratio is in the range of from 1.5/10 to 3/10, if the opening ratio were smaller than $$\frac{0.59}{\sqrt[3]{D}}$$

the highly viscous liquid would stay in a raised position so that it would be difficult to obtain a uniform or homogeneous flow condition or mixing. Furthermore, where the blade width ratio is smaller than 1.5/10 or even when the blade width ratio is within a range of from 1.5/10 to 3/10, if the opening ratio were larger than $2.28/\sqrt[3]{D}$, the raised highly viscous liquid would fall down immediately thus preventing the formation of satisfactory liquid films. As a result, the surface area of the liquid would not be increased thus preventing satisfactory flow conditions from being obtained.

In conventional helical ribbon impellers, it is usual to provide vertical supports for the blades for the purpose of increasing the mechanical strength of the blades and to act as scrapers, but in the novel impeller of this invention, such vertical supports are not only unnecessary, but they should be eliminated.

If vertical supports were provided, the liquid would flow and rotate only in the tangential direction and the flow of the liquid in the vertical direction would be greatly precluded. Thus, elimination of the vertical supports not only prevents this defect but also simplifies the construction.

The configuration of opening 14 is immaterial to this invention. Thus, the opening may be a continuous slot or may be circular, square or any other desired configurations. For example, the opening may comprise a series of circular openings having different diameters. It is not always necessary to provide the opening over the entire surface of the blade. If desired, the opening may be provided for only the upper half of the impeller. In this case, the total area used to define the term opening ratio means the total area of the upper half of the blade before forming the opening.

For a better understanding of the invention the following examples are given.

EXAMPLE 1

Figure 2:
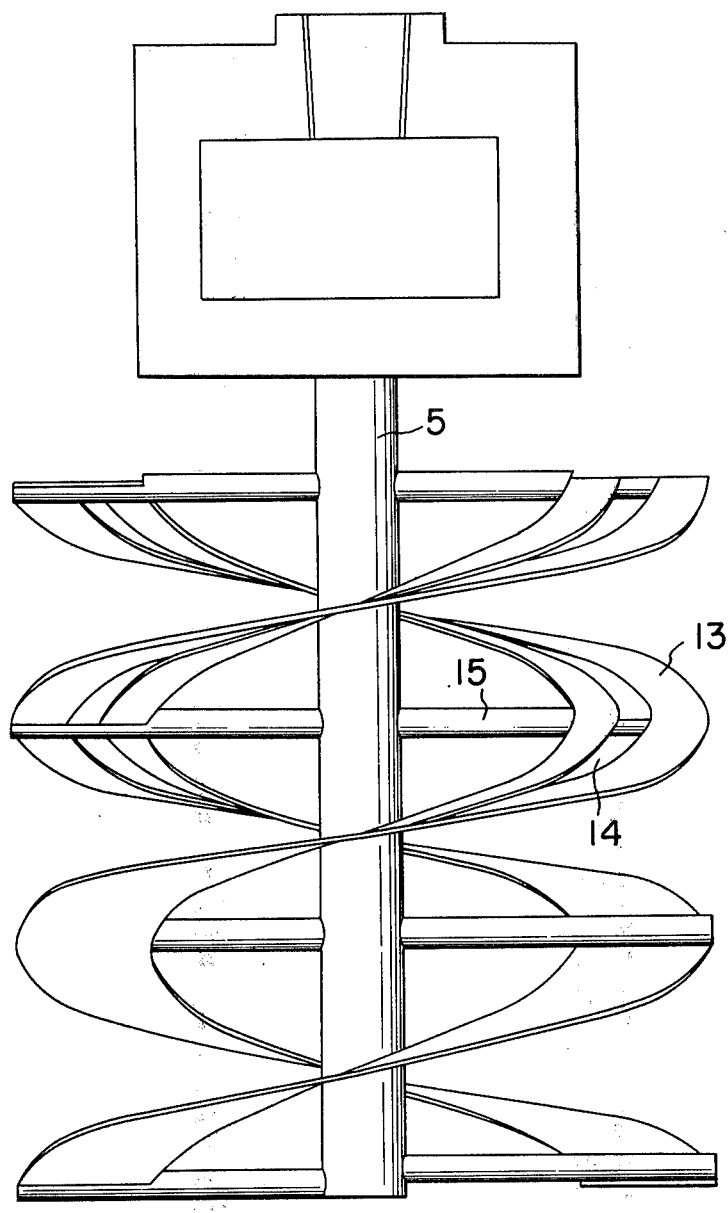
FIG. 2 is an enlarged side view of the helical ribbon impeller shown in FIG. 1.

In this example, the helical ribbon impeller had a configuration as shown in FIG. 2, in which the impeller length L in the axial direction was equal to the impeller diameter D, the impeller blade width R was 2/10 D and the pitch P was 0.67D. On the upper half of each blade was provided a slot having an opening ratio of 0.2. The stirring apparatus provided with such a helical ribbon impeller (hereinafter designated as impeller A) was used to mix highly viscous liquid having a viscosity of 3,000 to 6,000 poise, for example, reaction liquids for preparing polyesters such as esterification products followed by polycondensation reactions of telephthalic acid and ethylene glycol.

For comparison, stirring apparatus identical to that shown in FIG. 1 except that the impeller blade width R was changed to 1/10 D and that no opening was provided (hereinafter designated as impeller B) was used to stir the same highly viscous liquid.

Figure 3:
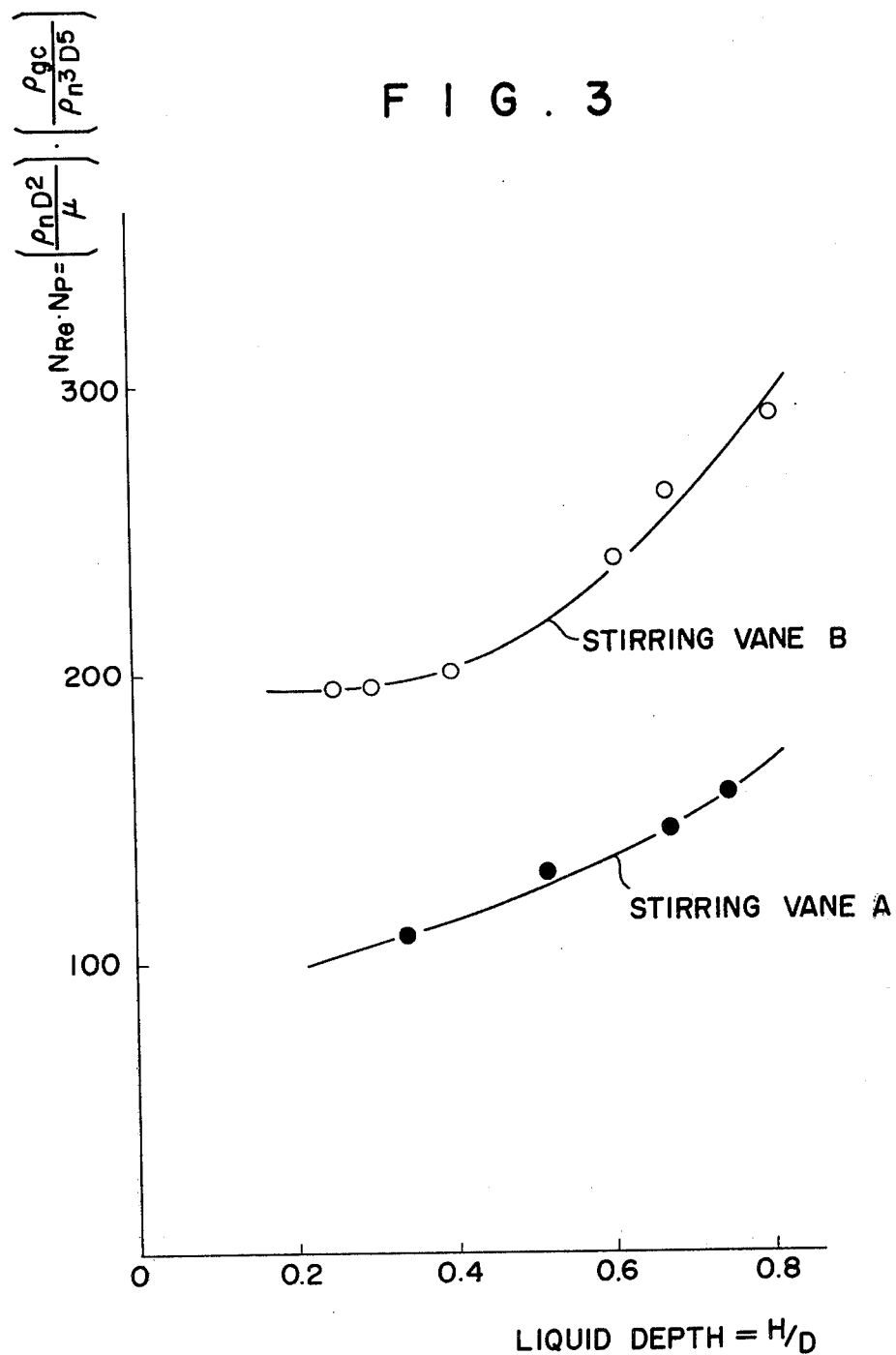
FIG. 3 is a graph showing the relationship between NRe.Np and the liquid depth.

FIG. 3 is a graph comparing the power comsumption of the impellers A and B from which it can be noted that the power consumption of the novel impeller A is only about one half of that of the prior art impeller B.

The power consumption was measured by using a strain gauge type torque meter and for the purpose of enabling easy comparison, the power consumption was expressed in terms of a product of impeller Reynolds Number NRe and Power Number Np.

$$\text{Thus, } NRe \cdot Np = \left[\frac{D^2 n \rho}{\mu}\right] \left[\frac{P g e}{\rho n^3 D^5}\right]$$

when $D$ = diameter of the impeller (m)
$n$ = rotational speed [rev/sec]
$\rho$ = density of the liquid (kg/m$^3$)
$\mu$ = viscosity (kg/m.sec.)
P = power (kg.m/sec)
ge = force-mass conversion factor (kg.m/kg.sec$^2$)

EXAMPLE 2

Figure 1:
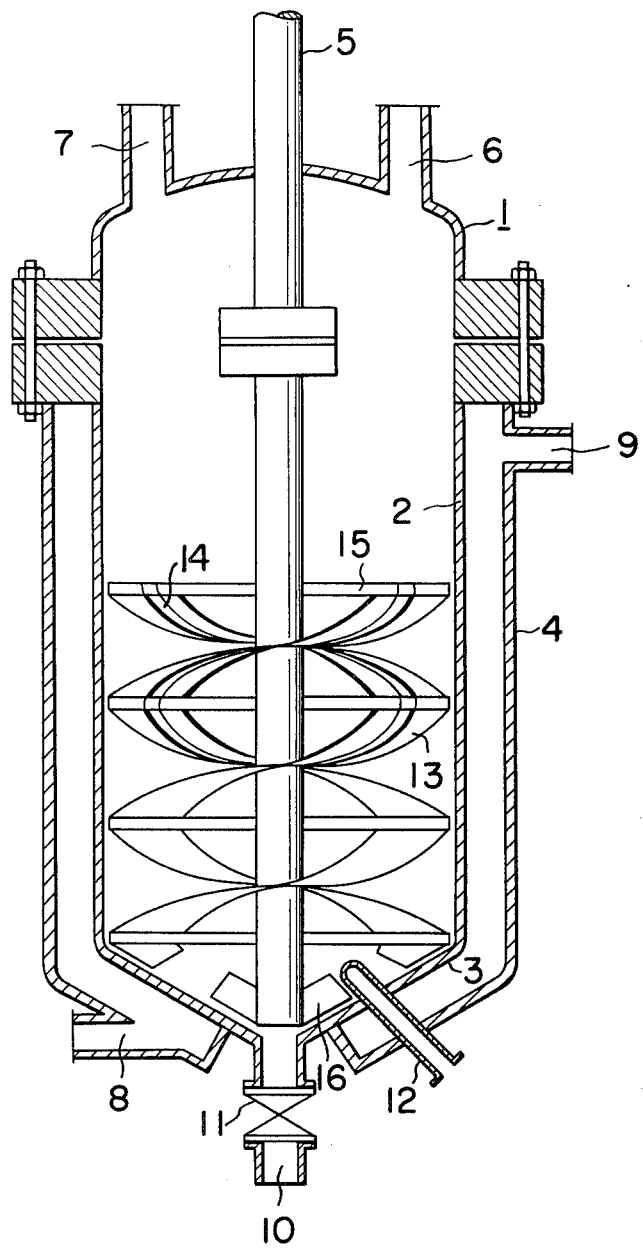
FIG. 1 is a longitudinal sectional view showing one example of stirring apparatus provided with helical ribbon impeller embodying the invention.

A liquid reaction mixture obtained by effecting an ester exchange reaction between dimethyl terephthalate and ethylene glycol at a molar ratio of 1 : 2.2, under normal pressure, and at a temperature of 220° C in the presence of a catalyst comprising CaO was heated and stirred in the stirring apparatus shown in FIG. 1 for effecting polymerization reaction.

For comprison, impellers A and B described in Example 1 were used. The polymerization-condensation reaction was started from a temperature of 220° C in the presence of the catalyst, and the temperature was increased gradually in two hours. After 2.5 hours the pressure was reduced to 0.2 mm Hg. As the reaction proceeds, the viscosity of the liquid increases so that the number of revolutions of the impeller was maintained at 40 rpm until the intrinsic viscosity [$\eta$] reaches 0.4 (trichloroethane/phenol = 1.1, at 30° C) and thereafter reduced to 10 rpm.

FIG. 4 shows the relationship between the intrinsic viscosity [$\eta$] and the reaction time (in hours) for impellers A and B. The curves plotted in FIG. 4 show that the rate of the polymerization-condensation reaction obtained by using the novel impeller A is considerably higher than that obtained by using the conventional impeller B.

EXAMPLE 3

The same highly viscous liquid was stirred by stirring apparatus of the same type as that shown in FIG. 1 wherein the impeller length L was equal to the impeller diameter D, blade width ratio = 2/10, the pitch was 0.67D and the impeller length, impeller diameter and the opening ratio were varied as shown in the following table. The flow pattern of the liquid was satisfactory in each case. The relationship between the opening ratio and the impeller diameter resulting in the optimum flow pattern is plotted in FIG. 5.

Table

| Impeller length L (cm) | Impeller dia. D (cm) | Blade width ratio R/D | Opening ratio | | | | |
| --- | --- | --- | --- | --- | --- | --- | --- |
| 35 | 35 | 2/10 | 0.70 | 0.65 | 0.5 | 0.25 | 0.20 |
| 60 | 60 | 2/10 | 0.60 | 0.55 | 0.4 | 0.20 | 0.15 |
| 200 | 200 | 2/10 | 0.40 | 0.35 | 0.2 | 0.15 | 0.1 |

The above table shows that satisfactory flow patterns were obtained respectively in the range of the opening ratio of from 0.70 to 0.02 where D = 35 cm, in the range of the opening ratio of from 0.60 to 0.15 where D = 60 cm and in the range of the opening ratio of from 0.40 to 0.1 where D = 200 cm.

It was found that when the opening ratio exceeds respective upper limits, the fall down velocity increased so that it was difficult to raise the liquid, and that as the opening ratio decreases below respective lower limits the liquid was raised thus rendering it difficult to fall down. Under these conditions the liquid is stirred while it stays in the upper portion of the tank thus preventing uniform flow and stirring.

From the foregoing description it will be noted that the invention provides a new and improved stirring apparatus provided with improved helical ribbon impeller capable of efficiently stirring liquids having high viscosities with a smaller power consumption than prior art stirring apparatus, and increasing the area of gas-liquid interface by frequently replenishing the surfaces of the interfaces which come into contact with the liquids. Accordingly, the novel stirring apparatus of this invention is suitable to stir highly viscous liquid and to remove by evaporation the components of the liquid which vaporize at low temperatures as in the case of preparing polyesters by poly condensation reactions.

We claim:

1. In a stirring apparatus of the helical ribbon type of the class comprising a tank, a rotary shaft vertically disposed in said tank, and a plurality of helical ribbon type impeller blades mounted on said rotary shaft, the improvement wherein:

the ratio of the width of each impeller blade to the diameter of the impeller is made to be from 1.5/10 to 3/10 and the impeller blade has defined therein one or more openings having an opening ratio expressed by a relation $0.59/\sqrt[3]{D}$ < opening ratio < $2.28/\sqrt[3]{D}$, where D represents the diameter of the impeller and the opening ratio is the ratio of the area of the opening to the total area of a helical ribbon type blade containing said opening, and said openings take the form of a slot extending in the direction of the length of the ribbon shaped blade.

2. The stirring apparatus according to claim 1 wherein each impeller blade is supported by said rotary shaft by means of a horizontal supporting member with the tip of the blade positioned close to the inner wall of said tank.

* * * * *